(12) United States Patent
Zheng et al.

(10) Patent No.: US 9,203,528 B2
(45) Date of Patent: Dec. 1, 2015

(54) METHOD FOR REDUCING FREQUENCY BAND INTERFERENCE FOR MULTI-MODE TERMINAL, MULTI-MODE TERMINAL, AND NETWORK DEVICE

(71) Applicant: HUAWEI TECHNOLOGIES CO., LTD., Shenzhen (CN)

(72) Inventors: Xiaochun Zheng, Shenzhen (CN); Xuehong Zeng, Shenzhen (CN); Jingjun Yang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 287 days.

(21) Appl. No.: 13/945,180

(22) Filed: Jul. 18, 2013

(65) Prior Publication Data

US 2013/0303235 A1  Nov. 14, 2013

Related U.S. Application Data

(63) Continuation of application No. PCT/CN2012/070546, filed on Jan. 18, 2012.

(30) Foreign Application Priority Data

Jan. 18, 2011  (CN) .......................... 2011 1 0020703

(51) Int. Cl.
*H04B 15/00* (2006.01)
*H04W 88/06* (2009.01)
(Continued)

(52) U.S. Cl.
CPC ........... *H04B 15/00* (2013.01); *H04W 72/1215* (2013.01); *H04W 88/06* (2013.01); *H04W 72/082* (2013.01)

(58) Field of Classification Search
CPC ................................ H04B 15/00; H04W 88/06
USPC ............... 455/552.1, 550.1, 553.1, 501, 41.2, 455/67.13, 63.1
See application file for complete search history.

(56) References Cited

U.S. PATENT DOCUMENTS

2004/0137849 A1  7/2004  Kloper et al.
2006/0276158 A1*  12/2006  Okabe .......................... 455/333
(Continued)

FOREIGN PATENT DOCUMENTS

| CN | 1842188 A   | 10/2006 |
|----|-------------|---------|
| CN | 101141750 A | 3/2008  |
| CN | 101300870 A | 11/2008 |
| CN | 102123466 A | 7/2011  |

OTHER PUBLICATIONS

PCT Written Opinion of the International Searching Authority mailed Apr. 19, 2012 in corresponding International Application No. PCT/CN2012/070546.
(Continued)

*Primary Examiner* — John J Lee
(74) *Attorney, Agent, or Firm* — Staas & Halsey LLP

(57) ABSTRACT

A method for reducing frequency band interference for a multi-mode terminal, including: using a first frequency band to establish a first service in a first network standard; using a second frequency band to establish a second service in a second network standard; when determining that the first frequency band and the second frequency band interfere with each other, updating a frequency band capability support state or reporting an interference collision event to a network corresponding to a low-priority service, so that the network corresponding to the low-priority service updates a frequency band used by the low-priority service to a frequency band that has less interference with a frequency band used by a high-priority service, and establishing the low-priority service according to the updated frequency band. According to the embodiments of the present invention, interference between frequency bands of the multi-mode terminal may be reduced.

14 Claims, 16 Drawing Sheets

(51) Int. Cl.
*H04W 72/12* (2009.01)
*H04W 72/08* (2009.01)

(56) References Cited

U.S. PATENT DOCUMENTS

2007/0021080 A1* 1/2007 Kuriyama et al. ............ 455/132
2007/0099567 A1* 5/2007 Chen et al. ................... 455/41.2
2009/0296785 A1* 12/2009 Wu et al. ...................... 375/132

OTHER PUBLICATIONS

Chinese Office Action issued Nov. 5, 2012 in corresponding Chinese Application No. 201110020703.7.
Chinese Office Action issued May 17, 2013 in corresponding Chinese Application No. 201110020703.7.
International Search Report mailed Apr. 19, 2012 in corresponding International Application No. PCT/CN2012/070546.

* cited by examiner

METHOD FOR REDUCING FREQUENCY BAND INTERFERENCE FOR MULTI-MODE TERMINAL, MULTI-MODE TERMINAL, AND NETWORK DEVICE

CROSS-REFERENCE TO RELATED APPLICATIONS

This application is a continuation of International Application No. PCT/CN2012/070546, filed on Jan. 18, 2012, which claims priority to Chinese Patent Application No. 201110020703.7, filed on Jan. 18, 2011, both of which are hereby incorporated by reference in their entireties.

FIELD OF THE INVENTION

The present invention relates to the field of communications technologies, and in particular, to a method for reducing frequency band interference for a multi-mode terminal, a multi-mode terminal, and a network device.

BACKGROUND OF THE INVENTION

With the rapid development of the mobile communications industry, a terminal at present is developing towards a direction of multi-standard and multi-service-connection. Here this kind of terminal supporting multiple standards is referred to as a multi-mode terminal. A typical example is various dual-mode mobile phones, including a TD-SCDMA/GSM dual-mode mobile phone or a WCDMA/GSM dual-mode mobile phone. With the development of LTE, a LTE/GSM or WCDMA/LTE dual-mode mobile phone and the like may emerge in the future.

Each standard supported by the multi-mode terminal may generally support multiple frequency bands. For example:

A GSM standard may support a GSM900 frequency band (890-915 MHz in the uplink and 935-960 MHz in the downlink) and a DCS1800 (1710-1785 MHz in the uplink and 1805-1880 MHz in the downlink) frequency band.

A TD-SCDMA (hereinafter abbreviated as TD) standard may support a frequency band A (2010-2025 MHz) and a frequency band F (1880-1900 MHz).

An LTE standard may support a frequency band 39 (1880-1920 MHz) and a frequency band 40 (2300-2400 MHz).

When the dual-mode terminal performs multiple services simultaneously (for example, uses a GSM network to perform a voice service and uses a TD-SCDMA or LTE network to perform a data service), if frequency bands allocated by the two networks are close to each other (for example, the GSM network allocates the 1800 MHz frequency band, and the TD-SDCMA allocates the frequency band F (1880-1900 MHz)), interference between the two services of the terminal becomes relatively severe, resulting in deterioration of service quality or even unavailability, and affecting user experience.

In the prior art, aiming at the foregoing problem of frequency band interference, antennas in different standards are separated as far as possible in space and distance mainly by properly laying out locations of the antennas, and some filters are added to mitigate an impact caused by the interference.

During a procedure of implementation of the present invention, the inventor finds that although the prior art may mitigate the impact caused by the interference to some extent, but due to constraint conditions such as a spatial location of the terminal and performance of a filter component, the impact cannot be further mitigated. Therefore, other ways are needed to further reduce mutual interference between the frequency bands, so as to mitigate the impact caused by the interference.

SUMMARY OF THE INVENTION

An embodiment of the present invention provides a method for reducing frequency band interference for a multi-mode terminal, where the method is used for reducing the frequency band interference when the multi-mode terminal performs concurrent services, including:

using a first frequency band to establish a first service in a first network standard;

using a second frequency band to establish a second service in a second network standard;

when determining that the first frequency band and the second frequency band interfere with each other, updating a frequency band capability support state or reporting an interference collision event to a network corresponding to a low-priority service, so that the network corresponding to the low-priority service updates, according to the frequency band capability support state of the dual-mode terminal or the interference collision event, a frequency band used by the low-priority service to a frequency band that has less interference with a frequency band used by a high-priority service, where the low-priority service is a service having a lower priority between the first service and the second service, and the high-priority service is a service having a higher priority between the first service and the second service; and establishing the low-priority service according to the updated frequency band.

An embodiment of the present invention further provides a method for reducing frequency band interference for a multi-mode terminal, including:

using a first frequency band to establish a first service in a first network standard;

when initiating a second service in a second network standard, applying to a second network for a second frequency band having less interference with the first frequency band; and when the application is successful, establishing the second service according to the second frequency band allocated by the second network.

An embodiment of the present invention further provides a method for reducing frequency band interference for a multi-mode terminal, including:

using a first frequency band to establish a first service in a first network standard;

using a second frequency band to establish a second service in a second network standard; and when determining that the first frequency band and the second frequency band interfere with each other, releasing a connection of a low-priority service, waiting for execution completion of a high-priority service, and then allowing establishing the low-priority service, where the low-priority service is a service having a lower priority between the first service and the second service, and the high-priority service is a service having a higher priority between the first service and the second service.

An embodiment of the present invention further provides a multi-mode terminal that may be configured to reduce frequency band interference when performing concurrent services, where the multi-mode terminal includes:

a first processing module, configured to use a first frequency band to establish a first service in a first network standard;

a second processing module, configured to use a second frequency band to establish a second service in a second network standard; and a determining module, configured to determine whether the first frequency band and the second frequency band interfere with each other; where when the determining module determines that the first frequency band and the second frequency band interfere with each other, the first processing module or the second processing module, which establishes a low-priority service, updates a frequency band capability support state or reports an interference collision event to a network corresponding to the low-priority service, so that the network corresponding to the low-priority service updates, according to the frequency band capability support state of the dual-mode terminal or the interference collision event, a frequency band used by the low-priority service to a frequency band that has less interference with a frequency band used by a high-priority service, where the low-priority service is a service having a lower priority between the first service and the second service, and the high-priority service is a service having a higher priority between the first service and the second service; and the first processing module or the second processing module, which establishes the low-priority service, establishes the low-priority service according to the updated frequency band.

An embodiment of the present invention further provides a multi-mode terminal, including:

a first processing module, configured to use a first frequency band to establish a first service in a first network standard; and a second processing module, configured to: when initiating a second service in a second network standard, apply to a second network for a second frequency band having less interference with the first frequency band; and when the application is successful, establish the second service according to the second frequency band allocated by the second network.

An embodiment of the present invention further provides a multi-mode terminal, including:

a first processing module, configured to use a first frequency band to establish a first service in a first network standard;

a second processing module, configured to use a second frequency band to establish a second service in a second network standard; and a determining module, configured to determine whether the first frequency band and the second frequency band interfere with each other;

where when the determining module determines that the first frequency band and the second frequency band interfere with each other, the first processing module or the second processing module, which establishes a low-priority service, releases a connection of the low-priority service, waits for execution completion of a high-priority service, and then allows establishing the low-priority service, where the low-priority service is a service having a lower priority between the first service and the second service, and the high-priority service is a service having a higher priority between the first service and the second service.

An embodiment of the present invention further provides a network device, including:

a sending unit, configured to send a measurement configuration instruction to a multi-mode terminal, where the multi-mode terminal uses a first frequency band to establish a first service in a first network standard before the sending unit sends the measurement configuration instruction, where an interference collision event is extended in the measurement configuration instruction;

a receiving unit, configured to receive a measurement report instruction which is sent by the multi-mode terminal and corresponds to the measurement configuration instruction, where the measurement report instruction carries the interference collision event and is an instruction sent to a network corresponding to a low-priority service when the multi-mode terminal determines that the first frequency band and a second frequency band interfere with each other after using the second frequency band to establish a second service in a second network standard, where the low-priority service is a service having a lower priority between the first service and the second service; and a resource allocating unit, configured to update, according to the interference collision event in the measurement report instruction received by the receiving unit, for the multi-mode terminal, a used frequency band to a frequency band that has less interference with a frequency band used by a high-priority service, so that the multi-mode terminal establishes the low-priority service according to the updated frequency band, where the high-priority service is a service having a higher priority between the first service and the second service.

An embodiment of the present invention further provides a network device, including:

a receiving unit, configured to receive a frequency band capability support state that a dual-mode terminal requests to update, where the dual-mode terminal uses a first frequency band to establish a first service in a first network standard, uses a second frequency band to establish a second service in a second network standard, and when determining that the first frequency band and the second frequency band interfere with each other, updates the frequency band capability support state to a network corresponding to a low-priority service, where the low-priority service is a service having a lower priority between the first service and the second service; and a resource allocating unit, configured to update, according to the frequency band capability support state that the dual-mode terminal requests to update, a frequency band used by the low-priority service to a frequency band that has less interference with a frequency band used by a high-priority service, so that the dual-mode terminal establishes the low-priority service according to the updated frequency band, where the high-priority service is a service having a higher priority between the first service and the second service.

The foregoing technical solutions have the following advantages:

According to the embodiments of the present invention, when different services are performed concurrently, a frequency band having less interference with one of the services is applied for or updated, thereby mitigating an impact brought by the frequency band interference when the services are performed concurrently.

BRIEF DESCRIPTION OF THE DRAWINGS

In order to describe the technical solutions in embodiments of the present invention more clearly, accompanying drawings needed in the description of the embodiments or the prior art are introduced briefly below. Obviously, the accompanying drawings are only some embodiments of the present invention, and persons of ordinary skill in the art may obtain other drawings according to these accompanying drawings without making creative efforts.

DETAILED DESCRIPTION OF THE EMBODIMENTS

To make the objectives, technical solutions, and advantages of the present invention clearer, the following further describes the present invention in detail with reference to specific embodiments and relevant accompanying drawings.

Embodiments of the present invention are used to solve a problem that frequency band interference occurs when a multi-mode terminal performs multiple services simultaneously, so as to further mitigate an impact brought by the frequency band interference. For ease of description, a "dual-mode terminal" is taken as an example for illustration.

The embodiments of the present invention provide a "single-card dual-mode terminal". The terminal uses one SIM (USIM) card, and includes two modules. For example, a TD/GSM single-card dual-mode terminal includes a TD module and a GSM module, where the TD module preferentially camps a PS (packet switched) domain on a TD network, and establishes a PS domain service (mainly a data service); and the GSM module preferentially camps a CS (circuit switched) domain on a GSM network, and establishes a CS domain service (mainly a voice service). When either of the networks has poor signal quality, the service corresponding to this network is handed over to the other module. For example, when the TD network has poor signal quality, the data service is handed over to the GSM module for the GSM module to process. Of course, to enable the two modules to work normally, the terminal may also include various adaptation and proxy modules for adapting the service and serving as a proxy for access of the SIM card. An advantage of the terminal is that the signal quality is better ensured. The CS domain preferentially camps on the GSM network, and the signal quality in the GSM network is generally better than that in the TD network. Therefore, quality of the CS domain service (the voice service) may be better ensured. The PS domain preferentially camps on the TD network and a data transmission rate in the TD network is generally better than that in the GSM network. Therefore, quality of the PS domain service (the data service) may also be ensured.

In a practical application, the "dual-mode terminal" may also be a dual-card dual-standby terminal, including two modules. The two modules may establish two services concurrently, each module corresponding to one SIM (USIM) card.

No matter based on which of the foregoing terminals, that the two modules need to concurrently establish services (for example, the voice service and the data service need to be established concurrently) may occur. If frequency bands used by the two modules of the terminal during establishment of the services are close to each other, a case of severe interference occurs. At this time, the technical solutions provided in the embodiments of the present invention may be used to reduce the interference.

The solutions of the present invention are hereinafter introduced in detail with reference to various embodiments.

Embodiment 1

Figure 1:
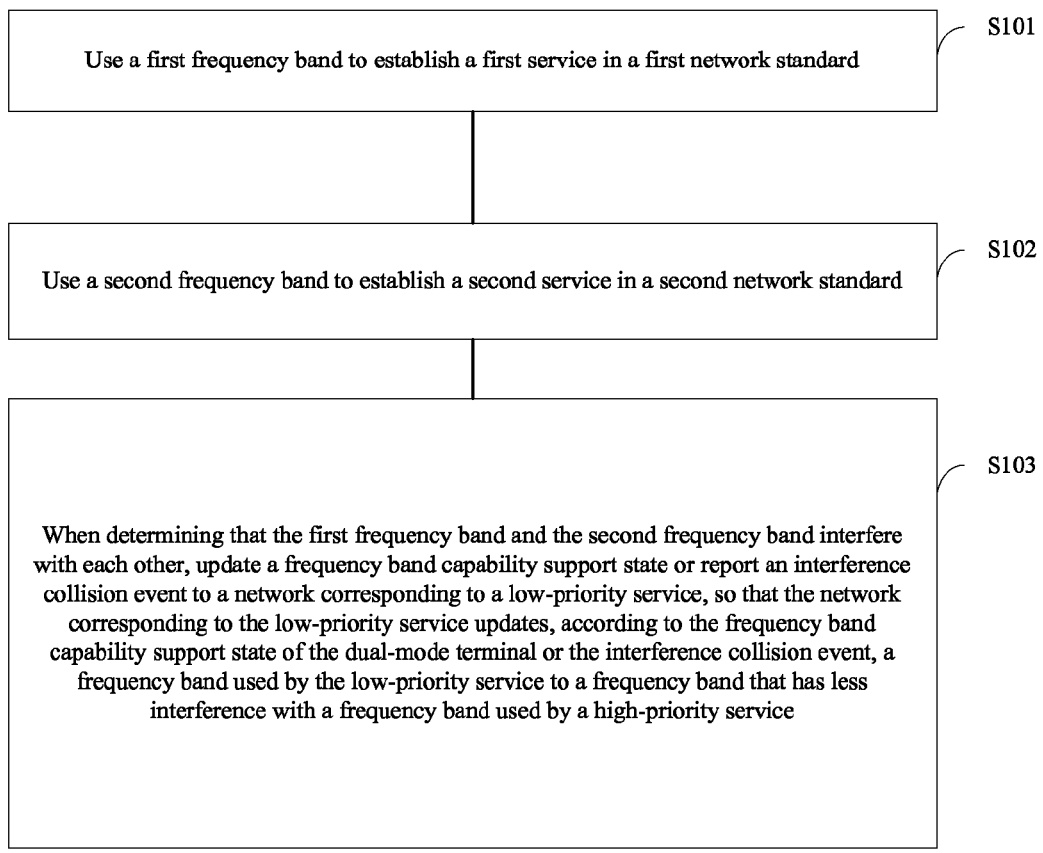
FIG. 1 is a schematic flowchart of a method according to Embodiment 1 of the present invention.

Referring to FIG. 1, an embodiment of the present invention provides a method for reducing frequency band interference for a multi-mode terminal, including:

S101. Use a first frequency band to establish a first service in a first network standard.

S102. Use a second frequency band to establish a second service in a second network standard.

S103. When determining that the first frequency band and the second frequency band interfere with each other, update a frequency band capability support state or report an interference collision event to a network corresponding to a low-priority service, so that the network corresponding to the low-priority service updates, according to the frequency band capability support state of the dual-mode terminal or the interference collision event, a frequency band used by the low-priority service to a frequency band that has less interference with a frequency band used by a high-priority service.

The low-priority service is a service having a lower priority between the first service and the second service, and the high-priority service is a service having a higher priority between the first service and the second service.

For ease of description, the embodiment of the present invention uses "a dual-mode terminal" as an example for illustration. The foregoing "first network" may be a network such as GSM, TD, WCDMA, or LTE, the foregoing "second network" may also be a network such as GSM, TD, WCDMA, or LTE, but different from the first network. For example, when the first network is a GSM network, the second network may be a TD, WCDMA, or LTE network.

The foregoing "first frequency band" is a frequency band used by the first network. For example, when the first network is a GSM network, the first frequency band may be GSM900 or DSC1800.

The foregoing "first service" is a service performed in the first network, for example, a voice service performed in the GSM network.

Likewise, the foregoing "second frequency band" and the "second service" represent meanings similar to those of "the first frequency band" and "the second service", respectively. For example, when the second network is a TD network, the second frequency may be a frequency band A or a frequency band F, and the second service may be a data service.

The foregoing "second frequency band having less interference with the first frequency band" may be a frequency band far from the other. For example, if the first frequency band is the DCS 1800 frequency band in GSM, "the second frequency band having less interference" may be a frequency band A in TD (2010-2025 MHz). Here, "less" is defined relatively to that second frequency band having more interference. For the DCS1800 frequency band in GSM, the F frequency band in TD (1880-1900 MHz) is close to the DCS 1800 frequency band, where more interference exists.

In addition, in the embodiment of the present invention, there is not a strict execution order of step S101 and step S102. Step 102 may also be executed first and then step S101 may be executed.

According to the embodiment of the present invention, whether the first frequency band and the second frequency band interfere with each other may be determined according to a preconfigured interfering frequency band relationship table. The interfering frequency band relationship table is used to indicate between which specific frequency bands interference exists, and if two frequency bands are close to each other, it is indicated that interference exists between the two frequency bands.

When it is determined that there is interference between each other, the terminal filters an interfering frequency band from a list of supported frequency bands (that is, the frequency band list includes information of the frequency bands supported by the terminal), reports an updated frequency band list to the network, so that the network reallocates, from the frequency band list reported by the terminal, a frequency band having less interference with the frequency band used by the high-priority service.

In the embodiment of the present invention, before reporting the interference collision event, the terminal receives a measurement configuration instruction delivered by the network, where the interference collision event is extended in the measurement configuration instruction, so that during subsequent reporting of the interference collision event, the subsequent interference collision event is reported by a measurement report instruction corresponding to the measurement configuration instruction. Specifically, event extension may be performed in the measurement configuration instruction.

In the embodiment of the present invention, an "interference collision event" is extended in a self-definition manner, and then the event is measured through the measurement configuration instruction delivered by the network. After receiving the measurement configuration instruction, if the terminal determines that frequency band interference occurs, it may report the interference collision event through the corresponding measurement configuration report instruction. Aiming at a TD network, the measurement configuration instruction may be a "MEASUREMENT CONTROL message", and the corresponding instruction for reporting is a "MEASUREMENT REPORT message"; aiming at an LTE network, the measurement configuration instruction may be an "RRCConnectionReconfiguration message", and the corresponding measurement report instruction for reporting is a "MEASUREMENT REPORT message".

In the embodiment of the present invention, when two services need to be performed concurrently, the terminal updates the frequency band capability support state or reports the interference collision event to the network corresponding to the low-priority service, so that the corresponding network updates the frequency band used by the low-priority service. In this way, the interference is reduced, meanwhile communication quality of the high-priority service may also be ensured. In a practical application, the low-priority service is generally a data service, and the high-priority service is generally a voice service. To ensure quality of the voice service, a frequency band used by the data service needs to be updated.

Specifically, the following describes the foregoing technical solution in detail based on a GSM/TD dual-mode terminal and a GSM/LTE dual-mode terminal, respectively.

(1) Based on the GSM/TD Dual-Mode Terminal

Figure 2:
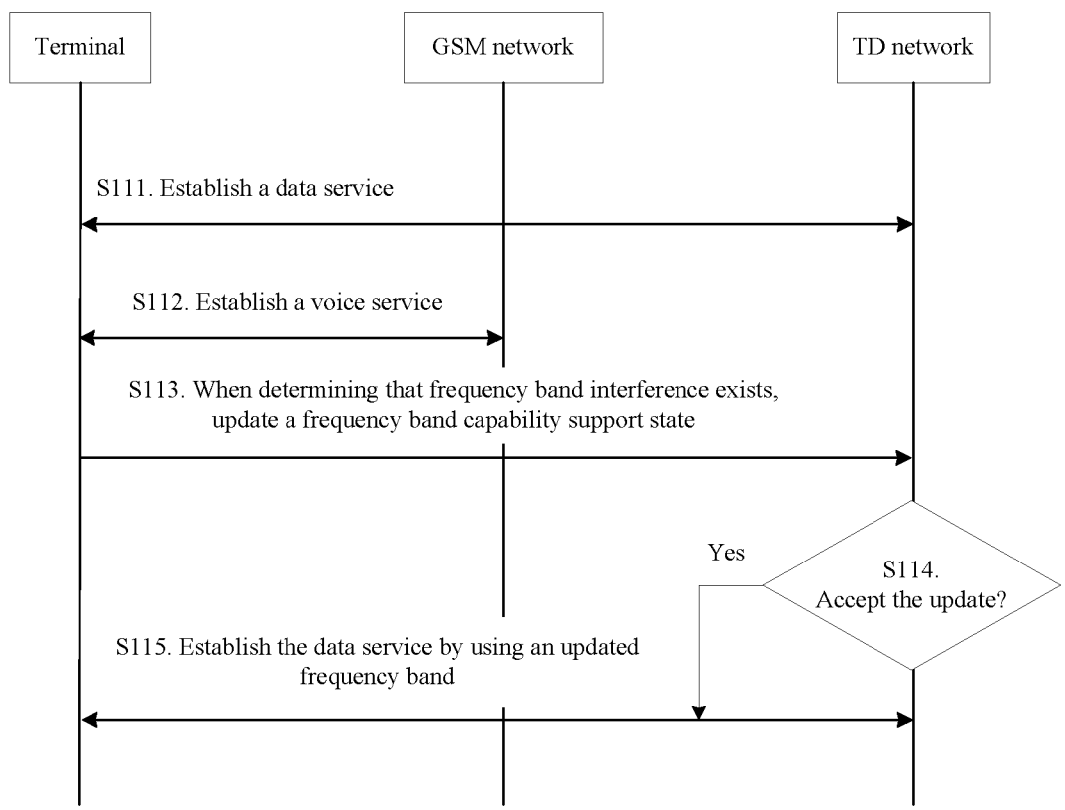
FIG. 2 is a schematic flowchart of a method based on a GSM/TD dual-mode terminal according to Embodiment 1 of the present invention.

Referring to FIG. 2, the frequency band capability support state is updated to a network, so that an implementation manner in which the network updates the frequency band used by the terminal includes the following steps:

S111. A terminal establishes a data service through a TD network.

S112. The terminal establishes a voice service through a GSM network.

There is not a strict order of the foregoing two steps. S112 may also be executed first and then S111 may be executed. During an execution procedure, frequency bands used are not limited.

S113. When determining that frequency band interference exists, the terminal updates a frequency band capability support state to the TD network.

For example, the data service uses a frequency band F, the voice service uses a DCS 1800 frequency band, when knowing, according to a preconfigured interfering frequency band relationship table (used to indicate between which frequency bands interference exists and a specific implementation form is not limited here), that the two frequency bands interfere with each other, the terminal updates the frequency band capability support state to the TD network and filters the frequency band F from the frequency band list.

Specifically, the terminal may send a UE CAPABILITY INFORMATION message and use an RF capability TDD field in a UE radio access capability field to carry the frequency band list.

S114. The TD network determines whether to authorize the update, and if yes, step S115 is executed.

When receiving the UE CAPABILITY INFORMATION, the network detects, according to the RF capability TDD field and the frequency band of a current service channel, that the terminal does not support a current frequency band. If the network has other available resources of a frequency band that is supported by the terminal, the network replies a UE CAPABILITY INFORMATION CONFIRM message carrying an acceptance cause value, and accepts the change of the terminal capability. Otherwise, a UE CAPABILITY INFORMATION CONFIRM message carrying a rejection cause value is replied.

If the network rejects the change of the terminal capability (for example, when the frequency band resources requested by the terminal are insufficient), the data service may be released, and the terminal does not establish the data service during execution of the voice service until the voice service ends, and then the data services allowed to be activated, so as to avoid mutual interference. Reference may be made to the description in the standards for a procedure of releasing the data service, which is not repeatedly described here.

S115. The terminal establishes the data service by using an updated frequency band.

If the network accepts the change of the terminal capability, the network and the terminal re-establish a data service channel using the updated frequency band (for example, a frequency band A) through a reconfiguration or handover process. Reference may be made to the existing standards for these processes, which are not repeatedly described here.

Figure 3:
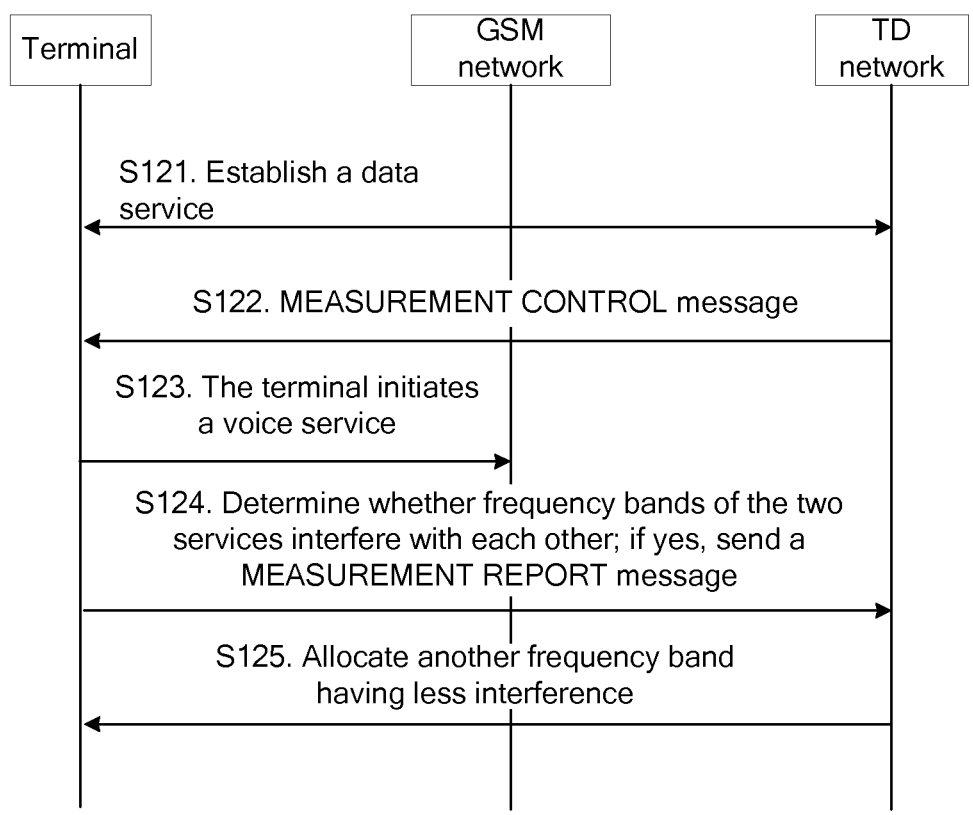
FIG. 3 is a schematic flowchart of another method based on the GSM/TD dual-mode terminal according to Embodiment 1 of the present invention.

In addition, in the embodiment of the present invention, the terminal may also notify the network by reporting an interference event, so that the network updates the frequency band of the terminal after receiving a notification. Specifically, referring to FIG. 3, the following steps are included:

S121. A terminal establishes a data service through a TD network.

S122. The TD network sends a MEASUREMENT CONTROL message to the terminal, and extends a new event type, which is defined as an "interference collision event".

Reference may be made to the definition in the existing standard for a procedure of sending the MEASUREMENT CONTROL message, which is not repeatedly described here. By sending the MEASUREMENT CONTROL message, subsequently, the terminal may report a corresponding event when the interference collision event occurs.

S123. The terminal initiates a voice service through a GSM network.

S124. The terminal determines whether frequency bands used by the two services interfere with each other, and if yes, sends a MEASUREMENT REPORT message to the TD network, where the message carries the "interference collision event".

For example, if the terminal finds, by searching an interfering frequency band relationship table, that the voice service uses a DCS1800 frequency band and that the data service uses a frequency band F, sends, to the network, the MEASUREMENT REPORT message carrying the "interference collision event".

When the frequency bands of the two services do not interfere (or the interference is relatively slight) with each other, no processing is performed.

S125. When determining, according to the received MEASUREMENT REPORT message, that the interference collision event exists and there are other frequency band resources, the TD network allocates, through a reconfiguration process, another frequency band to bear the data service.

If the TD network does not have other frequency band resources, the data service is released, and the terminal does not establish the data service during implementation of the voice service until the voice service ends, and then the data service is allowed to be activated, so as to avoid mutual interference.

(2) Based on the GSM/LTE Dual-Mode Terminal

Figure 4:
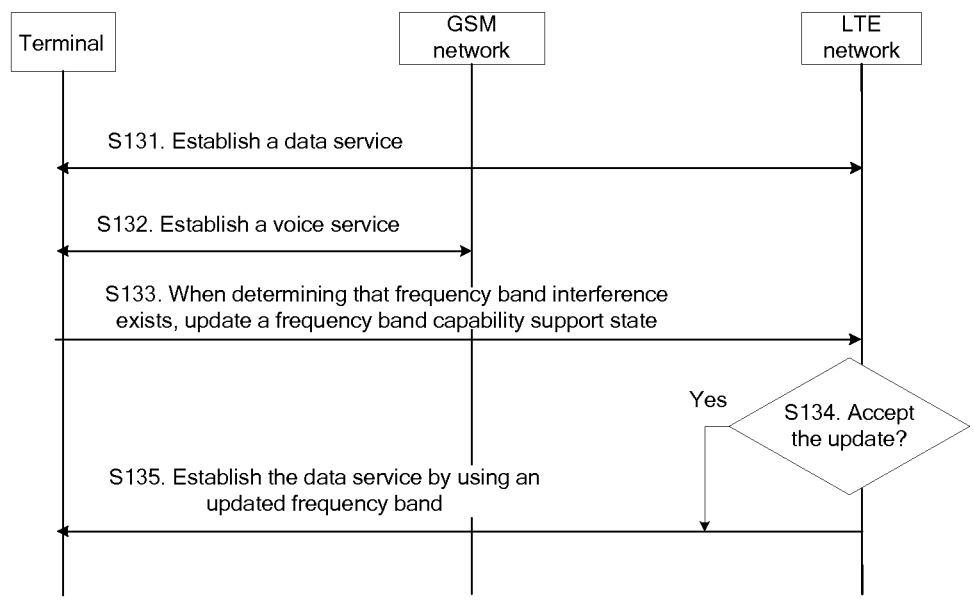
FIG. 4 is a schematic flowchart of a method based on a GSM/LTE dual-mode terminal according to Embodiment 1 of the present invention.
Figure 5:
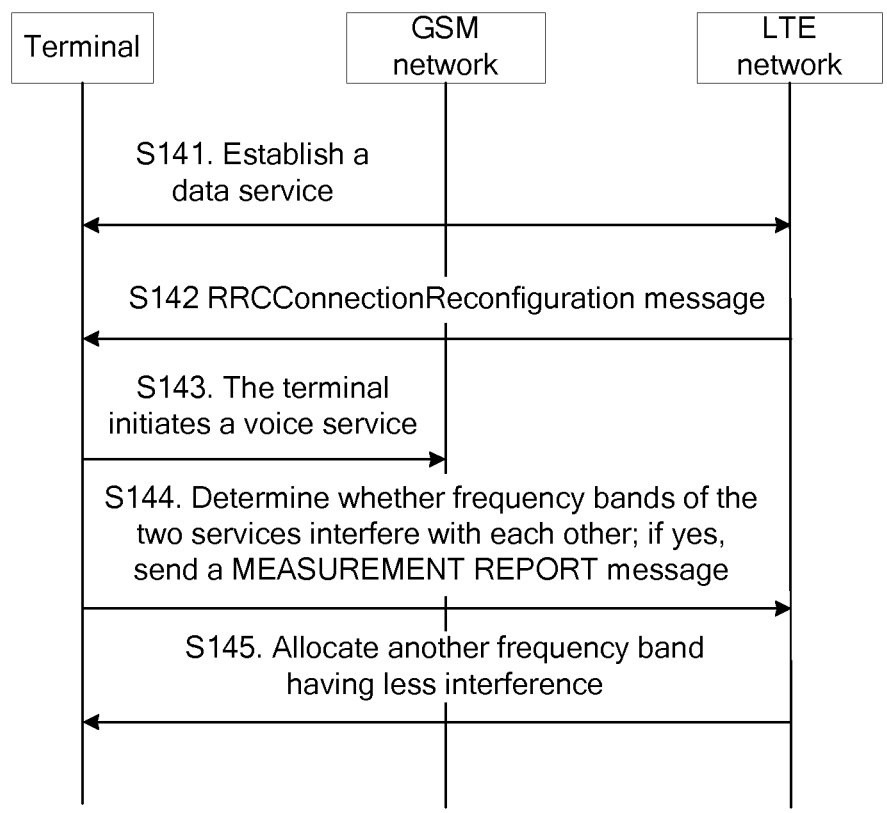
FIG. 5 is a schematic flowchart of another method based on the GSM/LTE dual-mode terminal according to Embodiment 1 of the present invention.

Referring to FIG. 4 and FIG. 5, similar to the implementation manners based on the GSM/TD dual-mode terminal, during implementation based on the GSM/LTE dual-mode terminal, the network may also be enabled to update a frequency band used by a low-priority service in the manners of updating the frequency band capability support state (FIG. 4) and reporting the interference collision event (FIG. 5). A specific implementation process is also similar to the foregoing process based on the GSM/TD dual-mode terminal. A main difference lies in specific implementation forms of various messages.

For example, in implementation by updating the frequency band capability support state, a UECapabilityInforamtion message in an LTE protocol may be used. in implementation by reporting the interference collision event, when an LTE network sends an RRCConnectionReconfiguration message to the terminal, a new event type is extent for MeasConfig, which is defined as an "interference collision event"; subsequently, if determining that the frequency bands used by the two services interfere with each other, the terminal sends the MEASUREMENT REPORT message to the LTE network, where the message carries the "interference collision event". Reference may be made to the implementation manner based on the GSM/TD dual-mode terminal for subsequent processing, which are not repeatedly described here.

Embodiment 2

Figure 6:
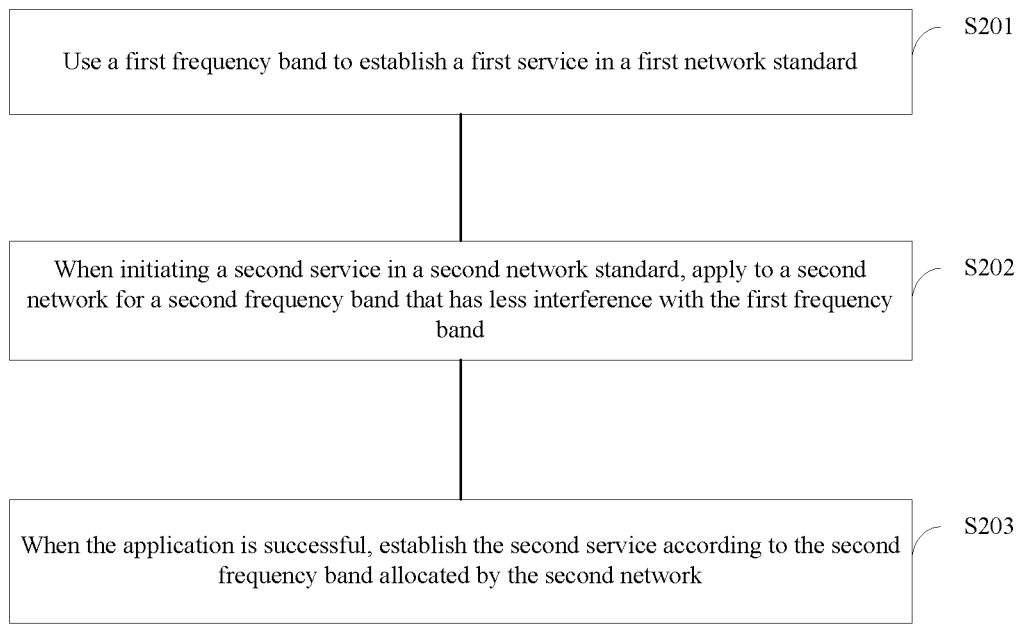
FIG. 6 is a schematic flowchart of a method according to Embodiment 2 of the present invention.

Referring to FIG. 6, an embodiment of the present invention provides a method for reducing frequency band interference for a multi-mode terminal, including the following steps:

S201. Use a first frequency band to establish a first service in a first network standard.

S202. When initiating a second service in a second network standard, apply to a second network for a second frequency band having less interference with the first frequency band.

S203. When the application is successful, establish the second service according to the second frequency band allocated by the second network.

In the embodiment of the present invention, reference may be made to the description in Embodiment 1 for definitions of the "first/second network", the "first/second frequency band", and the "first/second service", which are not repeatedly described here.

In the foregoing step 202, an application manner may include: filtering an interfering frequency band from a list of supported frequency bands, and sending the frequency band list to the network, where the frequency band list includes the second frequency band having less interference with the first frequency band, so that after receiving the frequency band list, the network allocates a frequency band having less interference to the terminal.

In the embodiment of the present invention, if the application fails, a low-priority service is released, and re-establishment of the low-priority service is allowed only after execution of a high-priority service completes, so as to avoid mutual interference.

The low-priority service is a service having a lower priority between the first service and the second service, and the high-priority service is a service having a higher priority between the first service and the second service. The "high-priority" service is generally a voice service (making a call) and the low-priority service is generally is a data service. Of course, according to the embodiment of the present invention, the "high priority" and the "low priority" may also be in other manners of self-definition. For example, a VoIP service (based on the data service) may be defined as a "high-priority" service whereas a short message service is defined as a low-priority service.

In the embodiment of the present invention, during establishment of the second service, the second frequency band having less interference with the first frequency band is applied for to the second network; if the application is successful, when the two services are performed concurrently, because less interference exists between the frequency bands used by the two services, the mutual interference may be reduced. If the application fails, the low-priority service is released, and the low-priority service is initiated after the high-priority service is completed. This avoids the mutual interference, so as to ensure that the high-priority service is completed in high quality.

For better illustration of the embodiment of the present invention, the following describes the solution in detail based on two dual-mode terminals: GSM/TD and GSM/LTE.

(1) Based on a GSM/TD Dual-Mode Terminal

The development of a GSM network is mature, and its signal coverage is better than that of a TD network. Therefore, it is more suitable for the voice service that has a higher requirement for signal quality. The TD network is a 3G network, and its data transmission rate is higher than that of the GSM network. Therefore, it is more suitable for the data service. Based on the foregoing features of the two networks, the dual-mode terminal may let a GSM module process the voice service and let a TD module to process the data service. When the two modules need to concurrently process the services, a problem of interference may occur because the used frequency bands are close to each other. At this time, such interference may be reduced by using the solution in the embodiment of the present invention. Specifically, performing concurrent services may be based on the following two scenarios: A. The voice service first and then the data service; and B. the data service first and then the voice service. The implementation solutions in these two scenarios each are described in detail.

A. The voice service first and then the data service

Figure 7:
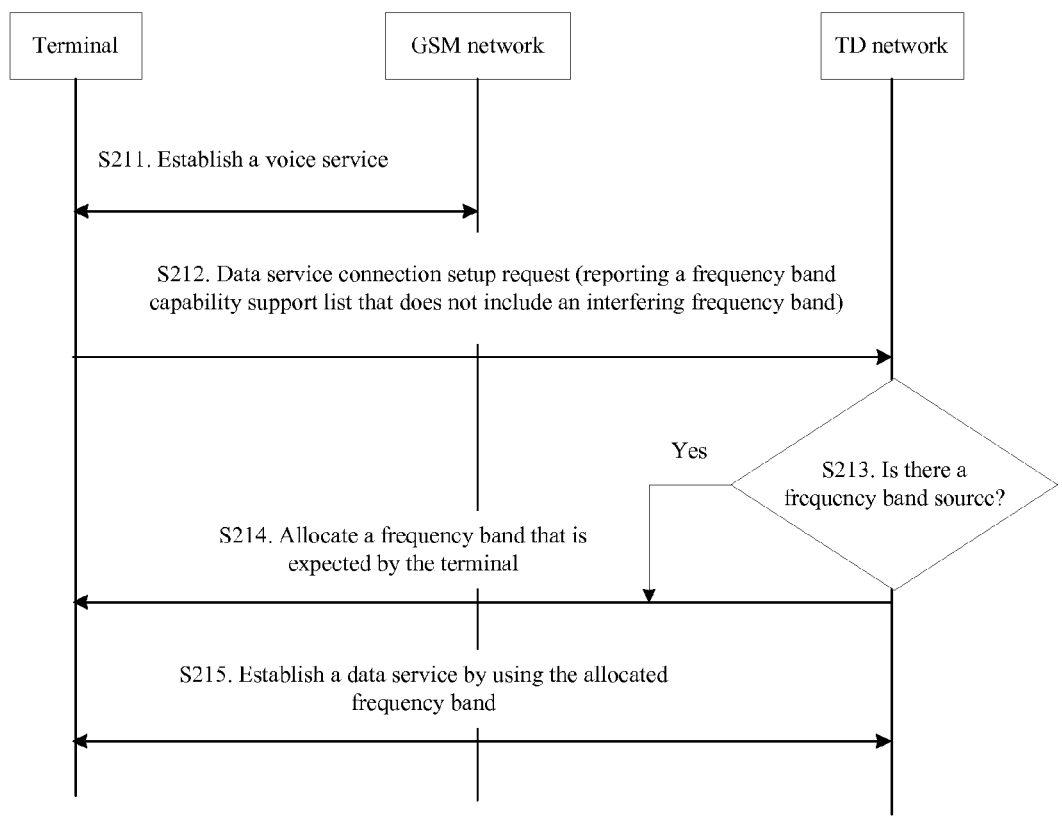
FIG. 7 is a schematic flowchart of a method based on a GSM/TD dual-mode terminal according to Embodiment 2 of the present invention.

Referring to FIG. 7, a schematic flowchart based on scenario A includes the following steps:

S211. A terminal first establishes a voice service in a GSM network.

The terminal first uses a first frequency band to establish the voice service. Assume that the first frequency band here is specifically a DCS 1800 frequency band.

S212. The terminal sends a data service connection setup request to a TD network and reports, to the network, a frequency band list expected which does not include an interfering frequency band.

The terminal determines, according to the frequency band (for example, DCS 1800) used by the established voice service, a frequency band (these frequency bands are far from DCS 1800) having less interference with it (for example, DCS 1800), which is reported to the network, expecting the TD network to allocate one of the frequency bands having less interference. Specifically, the terminal may query, according to the frequency band being used by the voice service, an interfering frequency band relationship table close to a GSM module and a TD module. If it is found by the query that the interfering frequency band exists (for example, a frequency band F (1880-1900 MHz)), the interfering frequency band (for example, the frequency band F (1880-1900 MHz)) is filtered from the list of frequency bands supported by the TD module, and the frequency band list of the terminal, where the list is to be reported to the network, does not carry the filtered interfering frequency band (for example, the frequency band F); if it is not found by the query that the interfering frequency band exists, the subsequent frequency band filtering processing is not performed.

The foregoing method for reporting a frequency band capability of the terminal may be carrying a frequency band capability of the terminal in a UE radio access capability field in an RRC CONNECTION SETUP COMPLETE. A using manner of the field has been defined in the existing protocols, which is not repeatedly described here.

S213. The TD network determines whether there is a frequency band resource supported by the terminal.

The TD network determines whether there is a frequency band resource supported by the terminal; and if yes, steps S214 and S215 are executed.

If no, the data service is released, and the terminal only allows initiation of the data service after execution of the voice service is completed. Because a priority of the voice service (for example, making a call) is generally higher than that of the data service (for example, browsing a web page), according to the embodiment of the present invention, the initiation of the data service is allowed only after the execution of the voice service is completed, which avoids interference caused by the data service to the voice service during implementation of the voice service, thereby ensuring service quality of a high-priority service (the voice service).

S214. Allocate a frequency band that is expected by the terminal.

If in step S113, when determining that there is a frequency band resource supported by the terminal, the TD network allocates the expected frequency band to the terminal.

S215. The terminal establishes the data service by using the allocated frequency band.

Scenario B. The data service first and then the voice service

Figure 8:
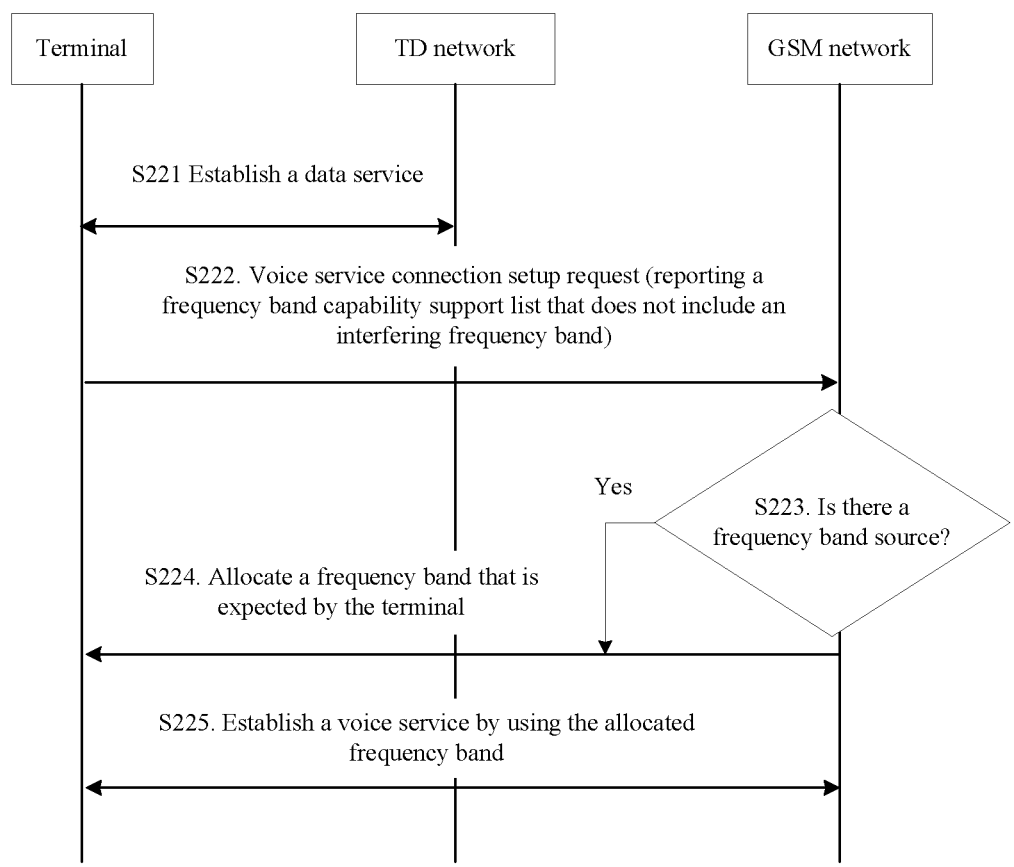
FIG. 8 is a schematic flowchart of another method based on the GSM/TD dual-mode terminal according to Embodiment 2 of the present invention.

Referring to FIG. 8, a schematic flowchart based on the scenario B includes the following steps:

S221. A terminal first establishes a data service in a TD network.

S222. The terminal sends a voice service connection setup request to a GSM network and reports, to the network, a frequency band list expected which does not include an interfering frequency band.

Specifically, the frequency band list may be reported through a Mobile Station Classmark 3 field in a Classmark Change message. Reference may be made to the protocols for a specific filling manner. The Classmark Change message is initiated by the terminal after immediate assignment is completed.

Selection of the interfering frequency band is similar to that in step S212. For example, if the terminal uses a frequency band F when establishing the service in the TD network, a DCS1800 frequency band is filtered from the frequency band list reported, and only a GSM900 frequency band is reported, expecting the network to allocate the GSM900 frequency band that does not interfere with the frequency band F in the TD network.

S223. The TD network determines whether there is a frequency band resource; if yes, steps S224 and S225 are executed; otherwise, a normal allocation failure process is executed; the terminal releases the data service, and re-establishes the voice service carrying all the frequency bands (with the interfering frequency band unfiltered) supported by the terminal. The terminal is allowed to establish the data service after the voice service ends.

S224. Allocate a frequency band that is expected by the terminal.

S225. The terminal establishes the voice service by using the allocated frequency band.

The following describes the embodiment of the present invention based on a GSM/LTE dual-mode terminal. Also two scenarios are involved: A. the voice service first and then the data service; and B. the data service first and then the voice service.

(2) Based on the GSM/LTE Dual-Mode Terminal

A. The Voice Service First and Then the Data Service

Figure 9:
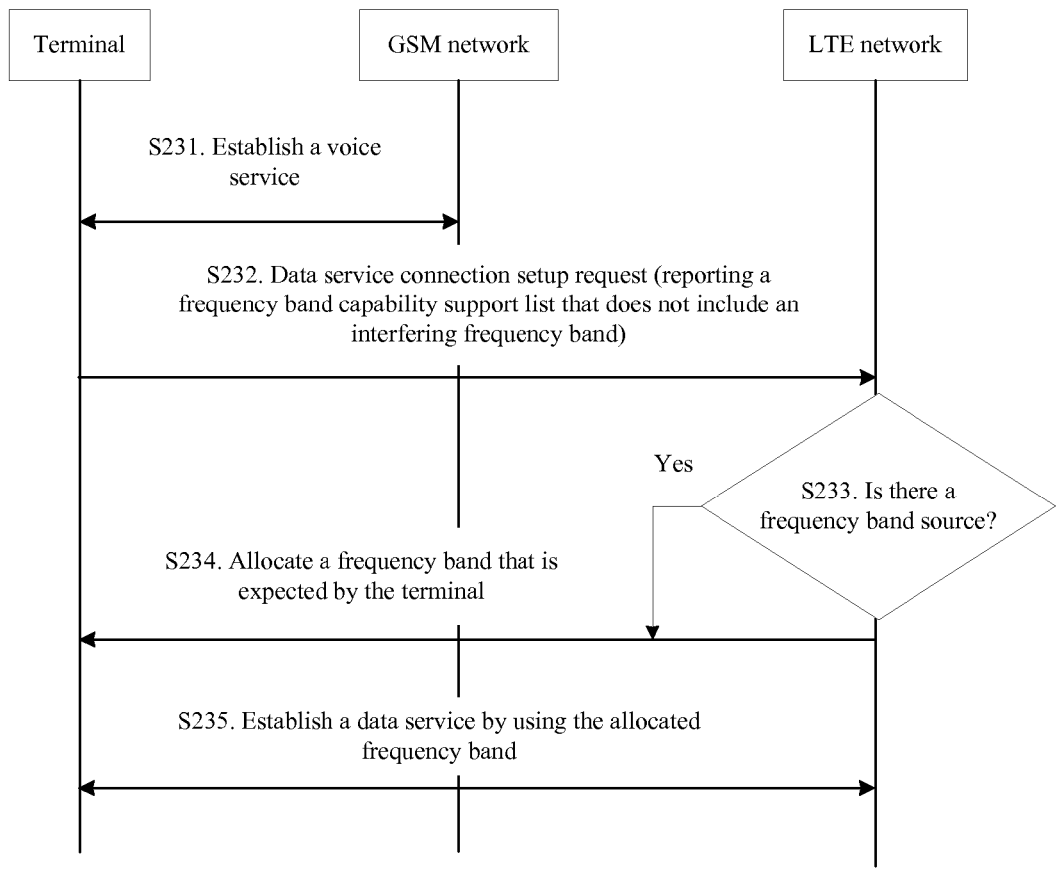
FIG. 9 is a schematic flowchart of a method based on a GSM/LTE dual-mode terminal according to Embodiment 2 of the present invention.

Referring to FIG. 9, reference may be made to the solution based on GSM/TD for a specific implementation manner of the solution based on the GSM/LTE dual-mode terminal. In specific implementation, a frequency band having less interference with a GSM-relevant frequency band may be determined according to the feature of an LTE network. For example, aiming at the DCS 1800 frequency band in a GSM network standard, a 40 frequency band in a LTE network standard is far from the DCS1800 frequency band and has less interference; a 39 frequency band is close to the DCS1800 frequency band and has more interference. Therefore, during reporting of a frequency band capability, the 39 frequency band may be filtered and only the 40 frequency band is reported.

Specifically, the terminal may update the frequency band capability through a Tracking area update request, where 1 is filled in a UE radio capability information update need, and the list of frequency bands supported by the terminal is updated in the Mobile Station Classmark 3. Reference may be made to the standard protocols for the specific filling manner. The network receives the Tracking area update request message, and updates the list of frequency bands supported by the terminal Subsequently, during the terminal initiates a data service establishment procedure in the LTE network, the network allocates a frequency band resource in the list of frequency bands supported by the terminal If successful, the service is performed by using the allocated frequency band resource; if fails, the data service is released, and the terminal does not initiate a data service establishment request before the voice service ends.

B. The Data Service First and Then the Voice Service

Figure 10:
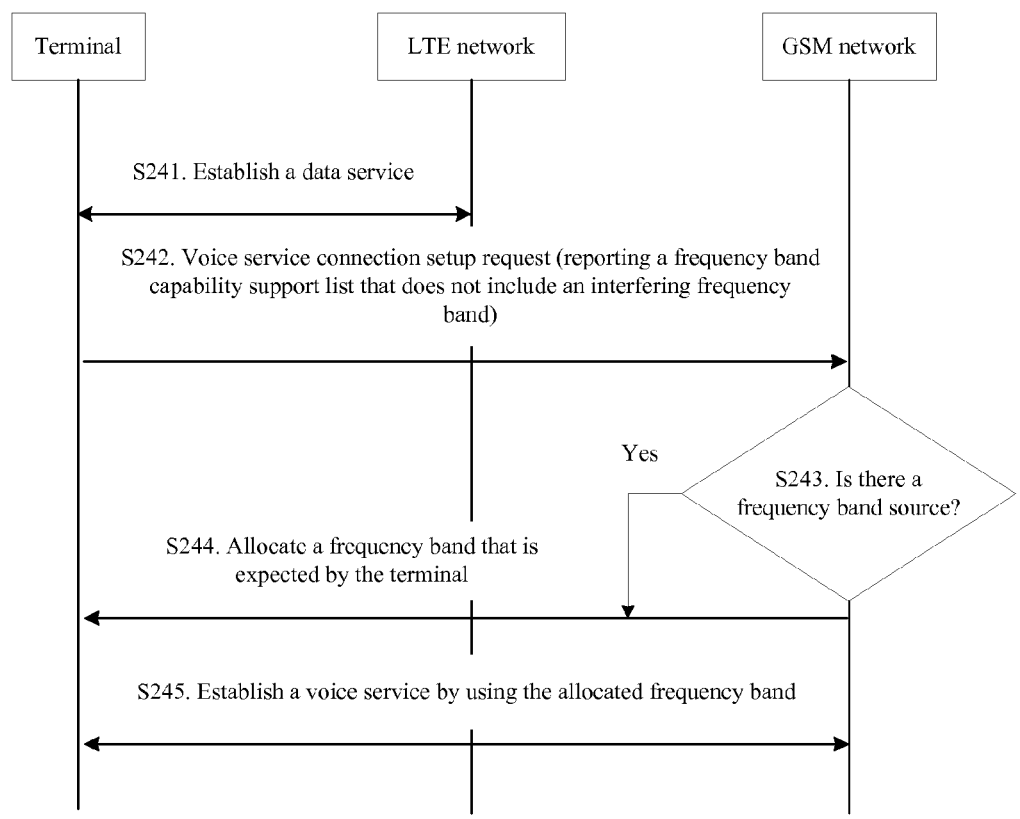
FIG. 10 is a schematic flowchart of another method based on the GSM/LTE dual-mode terminal according to Embodiment 2 of the present invention.

Referring to FIG. 10, its specific implementation manner is similar to the implementation manner based on the GSM/TD dual-mode terminal, which is not repeatedly described here. The reporting of the frequency band list may be specifically implemented through the Mobile Station Classmark 3 field in the Classmark Change message. Reference may be made to the related description in the standards for the specific filling manner, which is not repeatedly described here.

Embodiment 3

Figure 11:
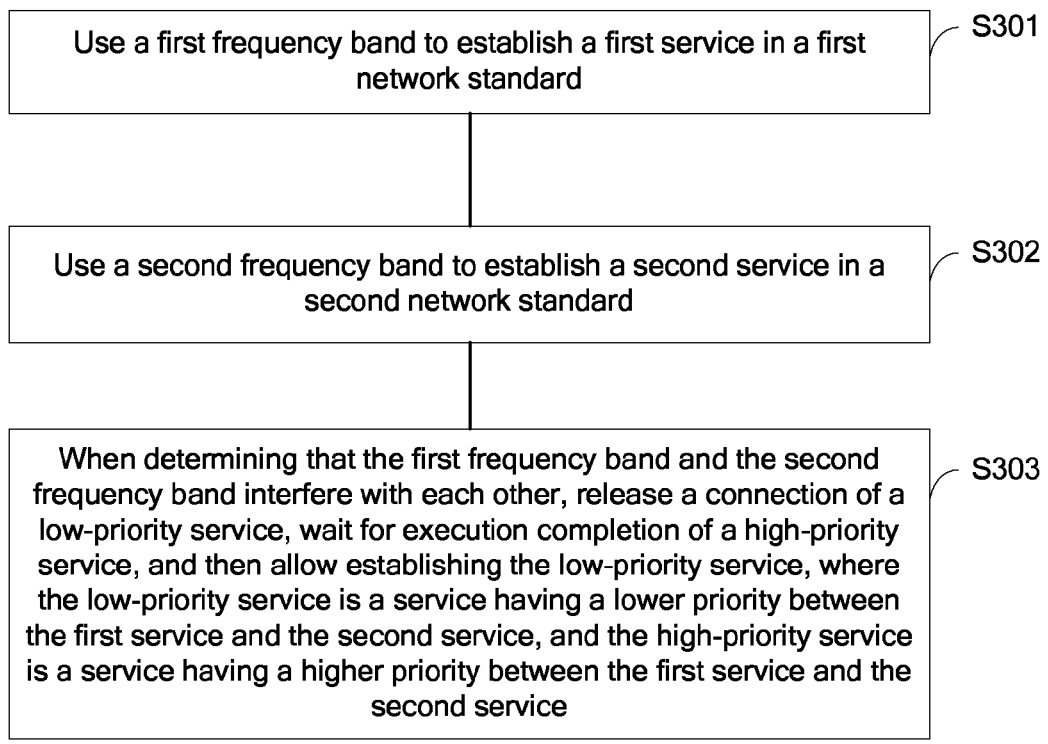
FIG. 11 is a schematic flowchart of a method according to Embodiment 3 of the present invention.

Referring to FIG. 11, an embodiment of the present invention provides a method for reducing frequency band interference for a terminal, including the following steps:

S301. Use a first frequency band to establish a first service in a first network standard.

S302. Use a second frequency band to establish a second service in a second network standard.

There is not an execution order for S301 and S302.

S303. When determining that the first frequency band and the second frequency band interfere with each other, release a connection of a low-priority service, wait for execution completion of a high-priority service, and then allow establishing the low-priority service, where the low-priority service is a service having a lower priority between the first service and the second service, and the high-priority service is a service having a higher priority between the first service and the second service.

Compared with Embodiment 2, according to this embodiment, when the frequency band interference occurs, a service frequency band is not updated, but the connection of the low-priority service is directly released to ensure communication quality of the high-priority service. Through the embodiment of the present invention, implementation is simpler and meanwhile an impact brought by the frequency band interference may be mitigated.

Likewise, the following uses a GSM/TD dual-mode terminal and a GSM/LTE dual-mode terminal as examples to describe the foregoing method in detail.

(1) Based on the GSM/TD Dual-Mode Terminal

Figure 12:
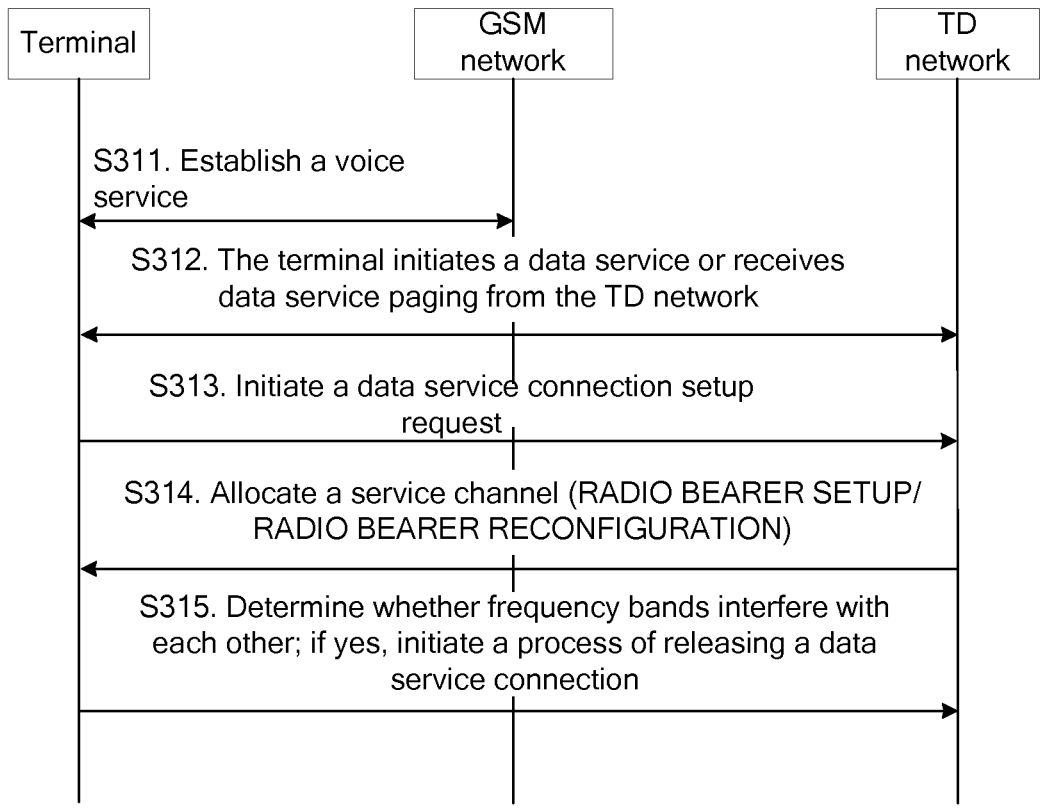
FIG. 12 is a schematic flowchart of a method based on a GSM/TD dual-mode terminal according to Embodiment 3 of the present invention.

Referring to FIG. 12, in a scenario of a voice service first and then a data service, the following steps are included:

S311. A terminal establishes a voice service through a GSM network. Assume that at this time a DCS 1800 frequency band is used.

S312. The terminal initiates a data service or receives a data service paging request from a TD network.

S313. The terminal initiates a data service connection setup request in the TD network.

S314. The TD network allocates a service channel to the data service through RADIO BEARER SETUP/RADIO BEARER RECONFIGURATION.

S315. The terminal determines whether the frequency band used by the voice service and a frequency band used by the data service interfere with each other; if yes, the terminal initiates a process of releasing a data service connection.

For example, assume that the data service uses a frequency band F, the terminal may know, by querying an interfering frequency band relationship table, the frequency band F and the DCS 1800 frequency band which is used by the voice service interfere with each other. At this time, the terminal initiates the process of releasing the data service connection. Specifically, the RADIO BEARER SETUP/RADIO BEARER RECONFIGURATION of the network may be responded by sending RADIO BEARER SETUP FAILURE/RADIO BEARER RECONFIGURATION FAILURE. Of course, if no mutual interference is detected between the frequency bands used by the two services, establishment of the data service connection continues to be completed.

Figure 13:
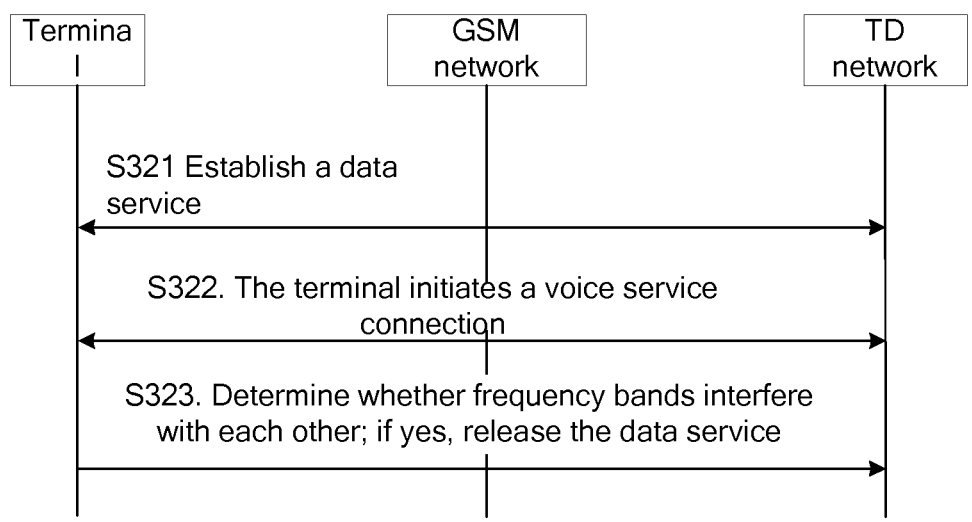
FIG. 13 is a schematic flowchart of another method based on the GSM/TD dual-mode terminal according to Embodiment 3 of the present invention.

Referring to FIG. 13, in a scenario of the data service first and then the voice service, the following steps are included:

S321. A terminal establishes a data service through a TD network. Assume that at this time a frequency band F is used.

S322. The terminal initiates a voice service connection through a GSM network. Assume that at this time a DCS 1800 frequency band is used.

S323. The terminal determines whether the frequency band used by the voice service and the frequency band used by the data service interfere with each other; if yes, the data service is released (because the frequency band F is close to the DCS1800 frequency band, mutual interference exists, and in this case the data service is released).

Specifically, the data service may be released through a PDP deactivation process. The specific PDP deactivation process is a process defined in the standards, which is not repeatedly described here.

(2) Based on the GSM/LTE Dual-Mode Terminal

Figure 14:
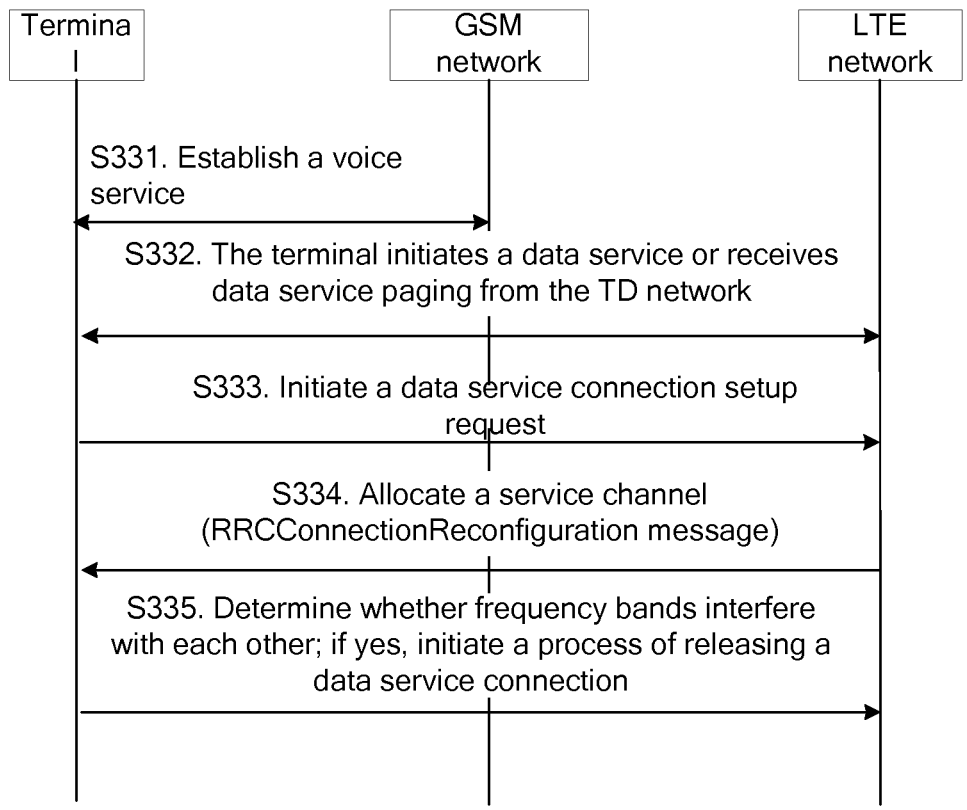
FIG. 14 is a schematic flowchart of a method based on a GSM/LTE dual-mode terminal according to Embodiment 3 of the present invention.

An implementation manner based on the GSM/LTE dual-mode terminal is similar to the foregoing implementation manner based on the GSM/LTE dual-mode terminal. Referring to FIG. 14, in a scenario of the voice service first and then the data service, the following steps are specifically included:

S331. A terminal establishes a voice service through a GSM network. Assume that at this time a DCS 1800 frequency band is used.

S332. The terminal initiates a data service or receives a data service paging request from an LTE network.

S333. The terminal initiates a data service connection setup request in the LTE network. Assume that at this time a frequency band 39 is used.

S334. The LTE network allocates a service channel to the data service through an RRCConnectionReconfiguration message.

S335. The terminal determines whether the frequency band used by the voice service and the frequency band used by the data service interfere with each other; if yes, the terminal initiates a process of releasing the data service connection (because the DCS1800 frequency band is close to the frequency band 39, mutual interference exists, and in this case the process of releasing the data service is initiated).

After receiving the RRCConnectionReconfiguration message, the terminal checks a frequency band to which the service channel allocated by the LTE network belongs, and queries an interfering frequency band relationship table according to the frequency bands allocated by the LTE network and the GSM network; if the frequency band is an interfering frequency band, the terminal initiates the process of releasing the data service connection. Specifically, RRCConnectionReestablishmentRequest may be sent to the network, where a value of reestabluishimentCauser is set to otherFailure.

If the frequency bands used by the two services do not interfere with each other, establishment of the data service connection continues to be completed.

Figure 15:
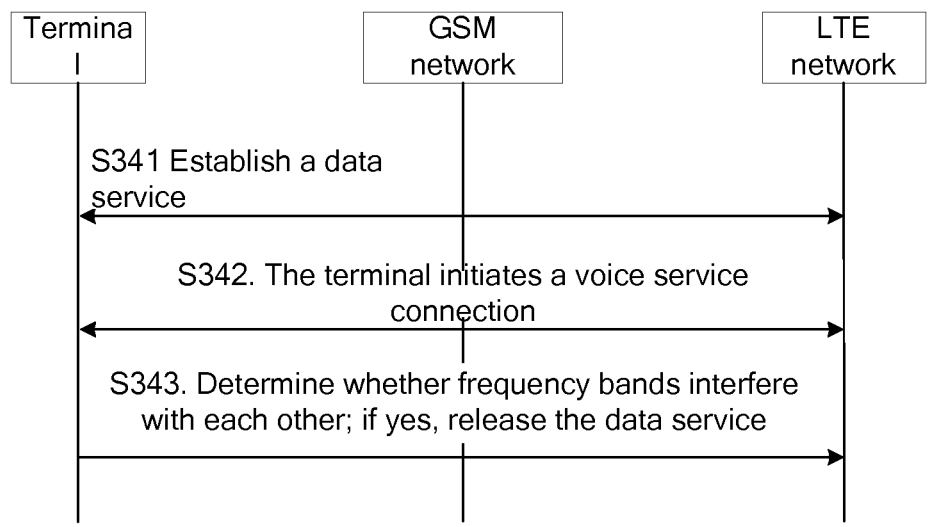
FIG. 15 is a schematic flowchart of another method based on the GSM/LTE dual-mode terminal according to Embodiment 3 of the present invention.

Referring to FIG. 15, in another scenario of the data service first and then the voice service, the following steps are specifically included:

S341. A terminal establishes a data service through an LTE network.

S342. The terminal initiates a voice service connection in a GSM network.

S343. The terminal determines whether frequency bands used by the two services interfere with each other; if yes, the data service is released (assume that the data service here is a low-priority service).

A specific process of releasing the service may be implemented by the terminal by transitioning an RRC state to an idle state.

If the terminal determines that mutual interference does not exist between the two services, processing is not performed.

Embodiment 4

Figure 16:
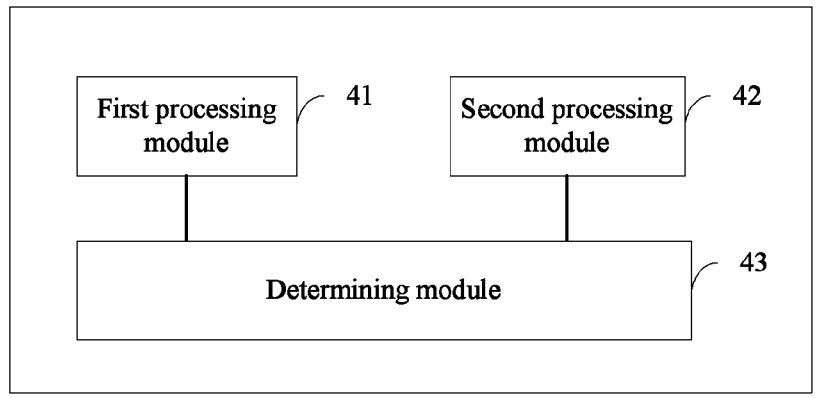
FIG. 16 is a schematic structural diagram of a dual-mode terminal according to Embodiment 4 of the present invention.

Referring to FIG. 16, an embodiment of the present invention provides a multi-mode terminal, including:

a first processing module 41, configured to use a first frequency band to establish a first service in a first network standard;

a second processing module 42, configured to use a second frequency band to establish a second service in a second network standard; and a determining module 43, configured to determine whether the first frequency band and the second frequency band interfere with each other; where when the determining module determines that the first frequency band and the second frequency band interfere with each other, the first processing module or the second processing module, which establishes a low-priority service, updates a frequency band capability support state or reports an interference collision event to a network corresponding to the low-priority service, so that the network corresponding to the low-priority service updates, according to the frequency band capability support state of the dual-mode terminal or the interference collision event, a frequency band used by the low-priority service to a frequency band having less interference with another service or a frequency band having less interference with a high-priority service, where the low-priority service is a service having a lower priority between the first service and the second service, and the high-priority service is a service having a higher priority between the first service and the second service; and the first processing module or the second processing module, which establishes the low-priority service, establishes the low-priority service according to the updated frequency band.

Reference may be made to the description in Embodiment 1 for a specific execution method related to each module in the terminal in the embodiment of the present invention, which is not repeatedly described here.

Embodiment 5

Figure 17:
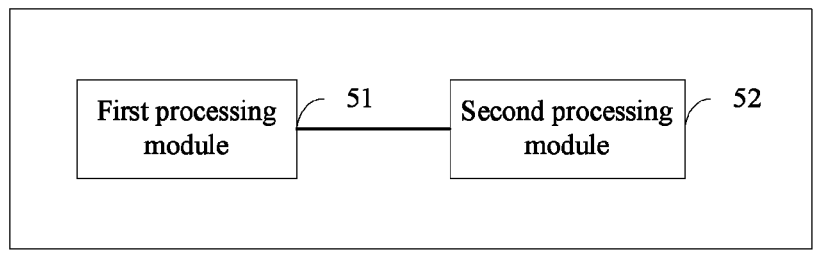
FIG. 17 is a schematic structural diagram of a dual-mode terminal according to Embodiment 5 of the present invention.

Referring to FIG. 17, an embodiment of the present invention provides a multi-mode terminal, including:

a first processing module 51, configured to use a first frequency band to establish a first service in a first network standard; and a second processing module 52, configured to: when initiating a second service in a second network standard, apply to a second network for a second frequency band having less interference with the first frequency band; and when the application is successful, establish the second service according to the second frequency band allocated by the second network.

The second processing module 52 is further configured to:

when the application fails, release a low-priority service, wait for execution completion of a high-priority service, and then allow establishing the low-priority service, where the low-priority service is a service having a lower priority between the first service and the second service, and the high-priority service is a service having a higher priority between the first service and the second service.

Reference may be made to the description in Embodiment 2 for a specific execution method related to each module in the terminal in the embodiment of the present invention, which is not repeatedly described here.

Embodiment 6

An embodiment of the present invention provides a multi-mode terminal, reference may be made to FIG. 16 for whose structural diagram, including:

a first processing module 41, configured to use a first frequency band to establish a first service in a first network standard;

a second processing module 42, configured to use a second frequency band to establish a second service in a second network standard; and a determining module 43, configured to determine whether the first frequency band and the second frequency band interfere with each other; where when the determining module determines that the first frequency band and the second frequency band interfere with each other, the first processing module or the second processing module, which establishes a low-priority service, releases a connection of the low-priority service, waits for execution completion of a high-priority service, and then allows establishing the low-priority service, where the low-priority service is a service having a lower priority between the first service and the second service, and the high-priority service is a service having a higher priority between the first service and the second service.

Reference may be made to the description in Embodiment 3 for a specific execution method related to each module in the terminal in the embodiment of the present invention, which is not repeatedly described here.

It should be noted that, in the foregoing Embodiment 4, 5, and 6, division of units merely represents division of logic functions; and in a practical usage, these modules are all implemented based on a certain hardware chip or circuit. The first processing module and the second processing module in Embodiment 4, 5, and 6 are also independent in terms of hardware. For example, each of them is implemented by using an independent processing chip or hardware circuit. The determining module in Embodiment 4 and 6 may use a separate processing chip, but in practice, to reduce the cost and simplify an operation, a function of the determining module is generally implemented on the hardware corresponding to the first processing module or the second processing module. For example, program codes related to the function of the determining module are added on the hardware chip corresponding to the first processing module. Of course, for mutual signal interaction, hardware chips are not totally independent from each other, but have some direct signal connections or indirect signal connections (through some intermediate circuits).

The multi-mode terminal in Embodiment 4, 5, and 6 may be a multi-card multi-mode terminal or a single-card multi-mode terminal. For ease of illustration, a dual-mode terminal (dual-card dual-mode or single-card dual-mode) is taken as an example here for illustration.

Nowadays, the dual-card dual-mode terminal is used widely. Two independent modules are used, and each module corresponds to a SIM (USIM) card. Its specific implementation is not described in detail in the embodiment of the present invention.

Figure 18:
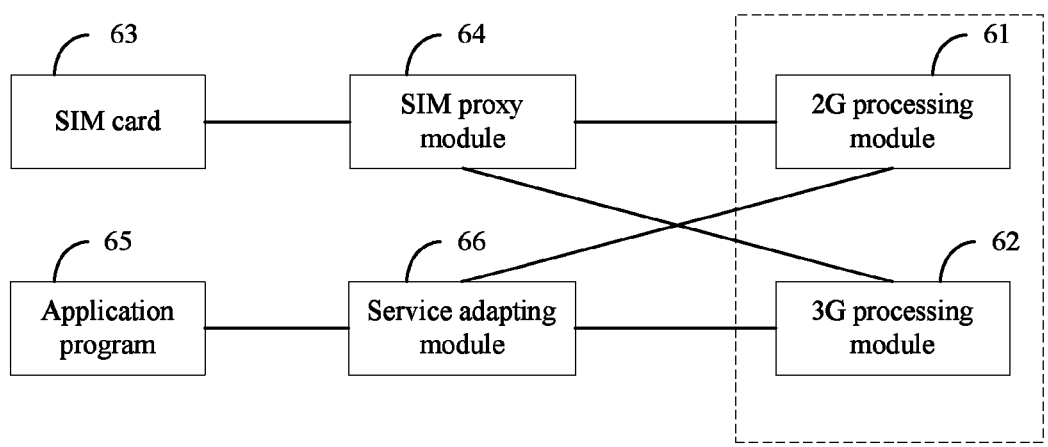
FIG. 18 is a schematic structural diagram of a single-card dual-mode dual-standby terminal according to an embodiment of the present invention.
Figure 19:
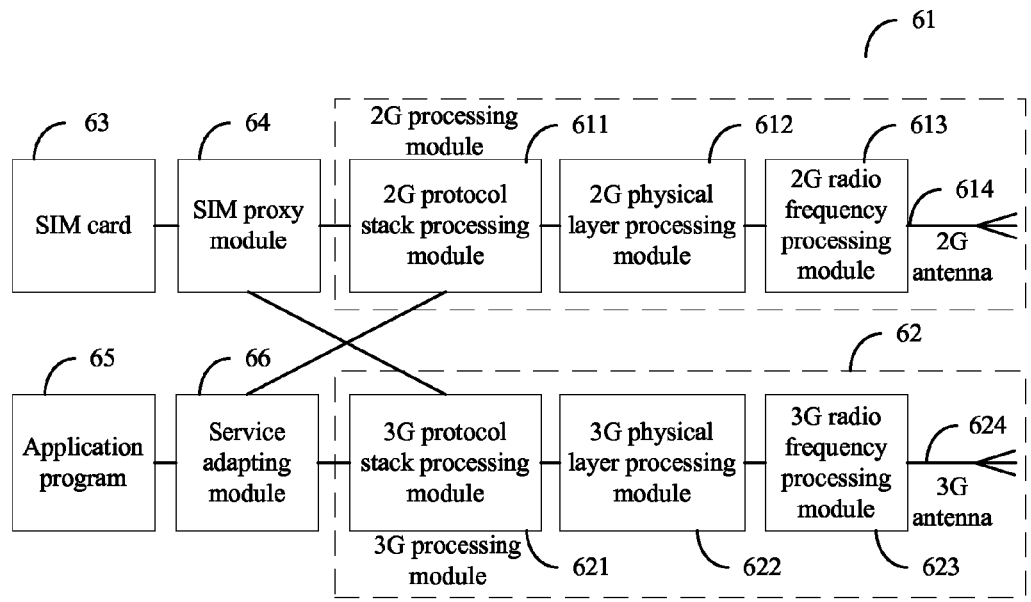
FIG. 19 is another schematic structural diagram of a single-card dual-mode dual-standby terminal according to an embodiment of the present invention.

The embodiment of the present invention provides a single-card dual-mode terminal, capable of working in a 2G network (for example, GSM), and a 3G network (for example, TD-SCDMA and WCDMA). Referring to FIG. 18, it is a schematic diagram of the single-card dual-mode terminal, including two independent processing modules: a 2G processing module 61 and a 3G processing module 62, which are configured to process 2G services and 3G services, respectively. Specifically, referring to FIG. 19, it is a specific schematic structural diagram of the 2G processing module and the 3G processing module, where the 2G processing module includes a 2G protocol stack processing module 611, a 2G physical layer processing module 612, a 2G radio frequency processing module 613, and a 2G antenna 614; the 3G processing module includes a 3G protocol stack processing module 621, a 3G physical layer processing module 622, a 3G radio frequency processing module 623, and a 3G antenna 624.

The 2G protocol stack processing module is configured to complete processing for related protocols in the 2G network, where these protocols are generally protocols above a physical layer; the 2G physical layer processing module is configured to complete processing for physical layer data; the 2G radio frequency processing module is configured to complete processing for a 2G radio frequency signal; and the 2G antenna is configured to complete signal transmission and reception in the 2G network.

Similar to submodules in the 2G processing module, in the 3G processing module, the 3G protocol stack processing module is configured to complete processing for related protocols in the 3G network; the 3G physical layer processing module is configured to complete processing for the physical layer data; the 3G radio frequency processing module is configured to complete processing for a 3G radio frequency signal; and the 3G antenna is configured to complete signal transmission and reception in the 3G network.

In addition, the terminal in the embodiment of the present invention includes a SIM card 63, a SIM proxy module 64, an application program 65, and a service adapting module 66, where the SIM card is configured to store some information of a user, including information of the user in the 2G network and the 3G network. The SIM card here may be a SIM card commonly used in the 2G network or a more advanced USIM card.

The SIM card proxy module is configured to serve as a proxy when the 2G and 3G protocol stack processing modules access the SIM card, so that they are capable of accessing the corresponding user information stored in the SIM card in the 2G or 3G network.

The application program refers to some programs which are installed in the terminal and are related to a service or control.

The service adapting module is configured to connect the application program to the 2G and 3G protocol stack processing modules, and mainly configured to select, according to camping states of 2G and 3G protocol stacks, a proper protocol stack to transmit the service. In addition, the service adapting module is also configured to perform coordination processing on the 2G protocol stack processing module and the 3G protocol stack processing module, for example, coordinating states of the two and informing a state of one to the other.

It should be noted that some certain functions in each foregoing module may also be separately implemented by or integrated into other modules. For example, the coordination function of the service module may be implemented by a separate module, or may be integrated into the 2G protocol stack processing module or the 3G protocol stack processing module. For example, during specific implementation by using hardware, assume that the module of 2G functions (including the protocol stack and physical layer processing modules) are implemented by using one chip, and the module of 3G functions (including the protocol stack and physical layer processing modules) are implemented by using another chip, codes for coordinating the states of the two may either be written on the chip which implements the module of the 2G functions, or may be written on the chip which implements the module of the 3G functions.

As mentioned in the foregoing in the embodiments of the present invention, a single-card dual-standby terminal provided in this embodiment of the present invention may preferentially camp a CS domain (for example, a voice service) on the 2G network, and preferentially camp a PS domain (for example, a data service) on the 3G network, implementing concurrent camping on the two networks. In this way, features of the two networks may be made full use of, and meanwhile voice quality (the 2G network provides better signal quality) is ensured and a transmission rate of the data service is improved (the 3G network provides a higher data transmission rate).

Embodiment 4, 5, and 6 may be performed based on the single-card dual-standby terminal. For example, in Embodiment 4, 5, and 6, the first processing module may be a 2G protocol stack processing module, and the second processing module may be a 3G protocol stack processing module; in Embodiment 4 and 6, the determining module may be a service adapting module, or may also be a functional module of the 2G protocol stack processing module or 3G protocol stack processing module, where its specific implementation form is not limited.

In addition, it should be noted that the foregoing Embodiment 1-6 all use the "dual-mode terminal" as an example for illustration. In practice, an implementation manner of a "tri-mode" or even a "multi-mode" terminal of more modes is similar to that in the foregoing case. For example, assume that there is a "tri-mode terminal" that has three different services needing to be concurrently established, during establishment of a service, it may be enabled to apply to the network for a frequency band that has less interference with the other two frequency bands, or a case where the application fails may be processed according to a certain policy (for example, according to a service priority). Accordingly, these terminals may have two relatively independent modules to implement the three services, where their implementation manner is equivalent to the foregoing implementation manner of the "dual-mode terminal", which is not repeatedly described here. Those skilled in the art may implement the implementation manner of reducing frequency band interference for the "multi-mode terminal" according to the implementation manner of reducing frequency band interference for the "dual-mode terminal".

In addition, apart from a GSM/TD terminal and a GSM/LTE terminal, the embodiment of the present invention may also be applied to other dual-mode terminals which are vulnerable to interference, for example, GSM/WCDMA and so on; or may be applied in a mobile phone of a newly emerged standard in the future (assume that a frequency band used in the new standard also has interference with a currently used frequency band).

Embodiment 7

Figure 20:
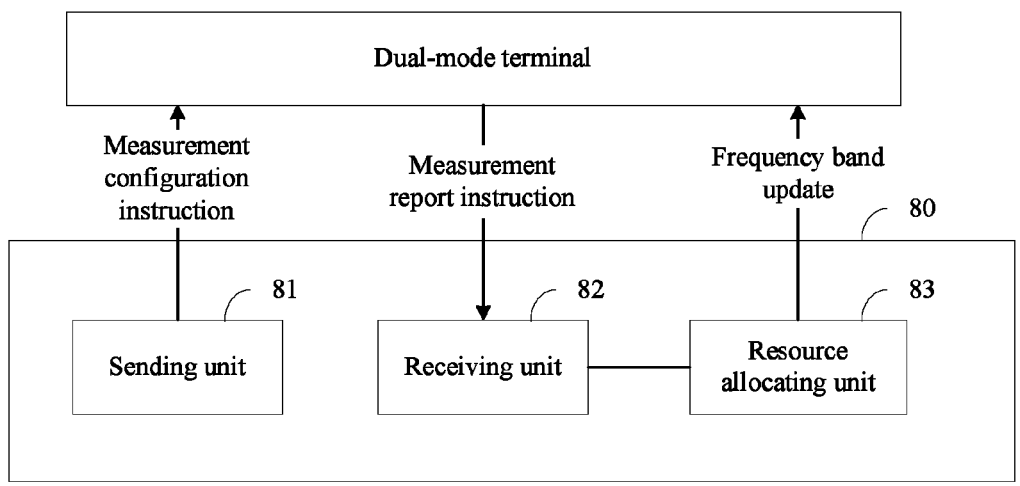
FIG. 20 is a schematic structural diagram of a network device according to Embodiment 7 of the present invention.

Referring to FIG. 20, an embodiment of the present invention provides a network device 80, configured to cooperate with the dual-mode terminal in the foregoing Embodiment 1 to complete a process of reducing frequency band interference, where the network device includes:

a sending unit 81, configured to send a measurement configuration instruction to a multi-mode terminal, where the multi-mode terminal uses a first frequency band to establish a first service in a first network standard before the sending unit sends the measurement configuration instruction, where an interference collision event is extended in the measurement configuration instruction;

a receiving unit 82, configured to receive a measurement report instruction which is sent by the multi-mode terminal and corresponds to the measurement configuration instruction, where the measurement report instruction carries the interference collision event and is an instruction sent to a network corresponding to a low-priority service when the multi-mode terminal determines that the first frequency band and a second frequency band interfere with each other after using the second frequency band to establish a second service in a second network standard, where the low-priority service is a service having a lower priority between the first service and the second service; and a resource allocating unit 83, configured to update, according to the interference collision event in the measurement report instruction received by the receiving unit, a frequency band used by the multi-mode terminal to a frequency band that has less interference with a frequency band used by a high-priority service, so that the multi-mode terminal establishes the low-priority service according to the updated frequency band, where the high-priority service is a service having a higher priority between the first service and the second service.

The network device in the embodiment of the present invention is based on the method for reducing the frequency band interference for the terminal according to Embodiment 1. Reference may be made to the description in Embodiment 1 for the specific procedure, which is not repeatedly described here.

Embodiment 8

Figure 21:
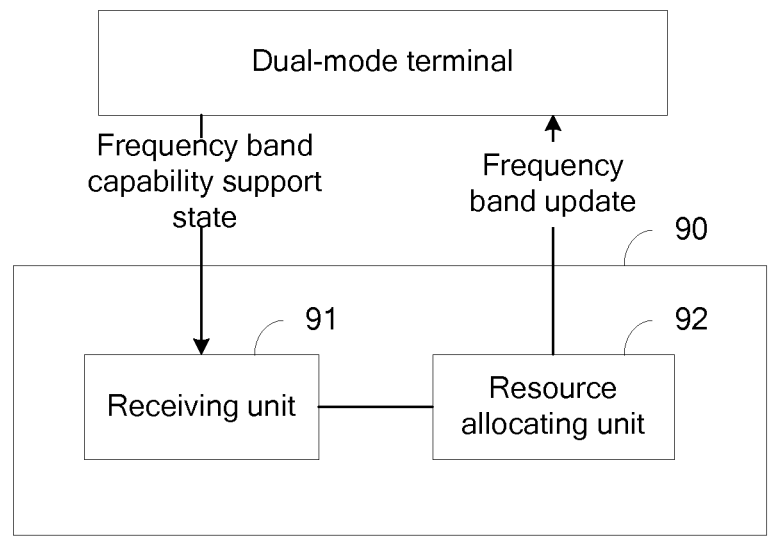
FIG. 21 is a schematic structural diagram of a network device according to Embodiment 8 of the present invention.

Referring to FIG. 21, an embodiment of the present invention provides a network device 90, configured to cooperate with the dual-mode terminal in the foregoing Embodiment 1 to complete a process of reducing frequency band interference, where the network device includes:

a receiving unit 91, configured to receive a frequency band capability support state that the dual-mode terminal requests to update, where the dual-mode terminal uses a first frequency band to establish a first service in a first network standard, uses a second frequency band to establish a second service in a second network standard, and when determining that the first frequency band and the second frequency band interfere with each other, updates the frequency band capability support state to a network corresponding to a low-priority service, where the low-priority service is a service having a lower priority between the first service and the second service; and a resource allocating unit 92, configured to update, according to the frequency band capability support state that the dual-mode terminal requests to update, a frequency band used by the low-priority service to a frequency band that has less interference with a frequency band used by a high-priority service, so that the dual-mode terminal establishes the low-priority service according to the updated frequency band, where the high-priority service is a service having a higher priority between the first service and the second service.

The network device in the embodiment of the present invention is based on the method for reducing the frequency band interference for the terminal according to Embodiment 1. Reference may be made to the description in Embodiment 1 for the specific procedure, which is not repeatedly described here.

It should be noted that, in Embodiment 7 and 8, division of each module is based on logic functions, and its specific hardware carrier may be based on various existing network devices. For example, aiming at a GSM network, the network device may be an RNC (Radio Network Controller, radio network controller); aiming at a TD network, the network device may be a BSC (Base Station Controller, base station controller); aiming at an LTE network, the network device may be an eNodeB (E-UTRAN NodeB, evolved NodeB). These network devices all have corresponding hardware processing modules (for example, various processors). The foregoing functional modules may be implemented by adding corresponding codes based on these hardware processing modules (processors). Such technologies are knowledge familiar to those skilled in the art, which are not repeatedly described here.

Persons of ordinary skill in the art may understand that all or part of the steps of the method according to the embodiments may be implemented by a computer program instructing relevant hardware. The program may be stored in a computer readable storage medium. When the program is established, the process of each method according to each foregoing embodiments may be included. The storage medium may be a magnetic disk, a compact disk, a read-only memory (Read-Only Memory, ROM), or a random access memory (Random Access Memory, RAM), and so on.

The foregoing exemplary embodiments further describe the objectives, technical solutions, and advantages of the present invention in detail. It should be understood that, the foregoing descriptions are merely exemplary embodiments of the present invention, but not intend to limit the present invention. Any modification, equivalent replacement, and improvement made without departing from the spirit and principle of the present invention shall fall within the protection scope of the present invention.

What is claimed is:

1. A method for reducing frequency band interference for a multi-mode terminal, comprising:
   using a first frequency band to establish a first service in a first network standard;
   using a second frequency band to establish a second service in a second network standard;
   when determining that the first frequency band and the second frequency band interfere with each other, updating a frequency band capability support state or reporting an interference collision event to a network corresponding to a low-priority service, if the network corresponding to the low-priority service updates, according to the frequency band capability support state of the terminal or the interference collision event, a frequency band used by the low-priority service to a frequency band that has less interference with a frequency band used by a high-priority service, establishing the low-priority service according to the updated frequency band; or,
   releasing a connection of a low-priority service, waiting for execution completion of a high-priority service, and then allowing establishing the low-priority service;
   wherein the low-priority service is a service having a lower priority between the first service and the second service, and the high-priority service is a service having a higher priority between the first service and the second service.

2. The method according to claim 1, wherein the determining whether the first frequency band interferes with the second frequency band comprises:
   determining, according to a preconfigured interfering frequency band relationship table, whether two frequency bands interfere with each other, wherein the interfering frequency band relationship table is used to indicate between which specific frequency bands interference exists, and if the two frequency bands are close to each other, interference exists between the two frequency bands.

3. The method according to claim 1, wherein the updating a frequency band capability support state to a network corresponding to a low-priority service, comprises:
   filtering an interfering frequency band from a list of supported frequency bands, and reporting an updated frequency band list to the network, so that the network reallocates, according to the frequency band list reported by the terminal, a frequency band having less interference with the frequency band used by the high-priority service.

4. The method according to claim 1, wherein before the reporting an interference collision event to a network corresponding to a low-priority service when determining that the first frequency band and the second frequency band interfere with each other, further comprises:
   receiving a measurement configuration instruction delivered by the network, wherein the interference collision event is extended in the measurement configuration instruction, so that during subsequent reporting of the interference collision event, the interference collision event is reported through a measurement report instruction corresponding to the measurement configuration instruction.

5. A method for reducing frequency band interference for a multi-mode terminal, comprising:
   using a first frequency band to establish a first service in a first network standard;
   when initiating a second service in a second network standard, applying to a second network for a second frequency band having less interference with the first frequency band; and
   when the application is successful, establishing the second service according to the second frequency band allocated by the second network.

6. The method according to claim 5, wherein the applying to a second network for a second frequency band having less interference with the first frequency band comprises:
   filtering an interfering frequency band from a list of supported frequency bands, and reporting the updated frequency band list to the second network, wherein the frequency band list comprises the second frequency band that has less interference with the first frequency band, so that the second network allocates the second frequency band to the terminal after receiving the frequency band list.

7. The method according to claim 5, further comprising:
   when the application fails, releasing a low-priority service, waiting for execution completion of a high-priority service, and then allowing establishing the low-priority service, wherein the low-priority service is a service having a lower priority between the first service and the second service, and the high-priority service is a service having a higher priority between the first service and the second service.

8. A multi-mode terminal, comprising:
   a first processing module, configured to use a first frequency band to establish a first service in a first network standard;
   a second processing module, configured to use a second frequency band to establish a second service in a second network standard; and
   a determining module, configured to determine whether the first frequency band and the second frequency band interfere with each other; wherein
   when the determining module determines that the first frequency band and the second frequency band interfere with each other, the first processing module or the second processing module, which establishes a low-priority service, updates a frequency band capability support state or reports an interference collision event to a network corresponding to the low-priority service, if the network corresponding to the low-priority service updates, according to the frequency band capability support state of the terminal, a frequency band used by the low-priority service to a frequency band used that has less interference with a frequency band used by a high-priority service, establishes the low-priority service according to the updated frequency band; or,
   releases a connection of the low-priority service, waits for execution completion of a high-priority service, and then allows establishing the low-priority service;

wherein the low-priority service is a service having a lower priority between the first service and the second service, and the high-priority service is a service having a higher priority between the first service and the second service.

9. The multi-mode terminal according to claim 8, wherein the determining whether the first frequency band and the second frequency band interfere with each other, comprises:

determining, according to a preconfigured interfering frequency band relationship table, whether two frequency bands interfere with each other, wherein the interfering frequency band relationship table is used to indicate between which specific frequency bands interference exists, and if the two frequency bands are close to each other, interference exists between the two frequency bands.

10. The multi-mode terminal according to claim 8, wherein the updates a frequency band capability support state to a network corresponding to a low-priority service, comprises:

filtering an interfering frequency band from a list of supported frequency bands, and reporting an updated frequency band list to the network, so that the network reallocates, according to the frequency band list reported by the terminal, a frequency band having less interference with the frequency band used by the high-priority service.

11. The multi-mode terminal according to claim 8, wherein before the reports an interference collision event to a network corresponding to a low-priority service when determining that the first frequency band and the second frequency band interfere with each other, further comprises:

receiving a measurement configuration instruction delivered by the network, wherein the interference collision event is extended in the measurement configuration instruction, so that during subsequent reporting of the interference collision event, the interference collision event is reported through a measurement report instruction corresponding to the measurement configuration instruction.

12. A multi-mode terminal, comprising:

a first processing module, configured to use a first frequency band to establish a first service in a first network standard; and a second processing module, configured to: when initiating a second service in a second network standard, apply to a second network for a second frequency band that has less interference with the first frequency band; and when the application is successful, establish the second service according to the second frequency band allocated by the second network.

13. The multi-mode terminal according to claim 12, wherein the second processing module is further configured to:

filtering an interfering frequency band from a list of supported frequency bands, and reporting the updated frequency band list to the second network, wherein the frequency band list comprises the second frequency band that has less interference with the first frequency band, so that the second network allocates the second frequency band to the terminal after receiving the frequency band list.

14. The multi-mode terminal according to claim 12, wherein the second processing module is further configured to:

when the application fails, release a low-priority service, wait for execution completion of a high-priority service, and then allow establishing a low-priority service, wherein the low-priority service is a service having a lower priority between the first service and the second service, and the high-priority service is a service having a higher priority between the first service and the second service.

* * * * *